United States Patent [19]

Wiknich

[11] 4,240,542
[45] Dec. 23, 1980

[54] WALKING BEAM ACCUMULATING CONVEYOR

[75] Inventor: Douglas D. Wiknich, Utica, Mich.

[73] Assignee: Harry Major Machine & Tool Co., Fraser, Mich.

[21] Appl. No.: 78,217

[22] Filed: Sep. 24, 1979

Related U.S. Application Data

[63] Continuation of Ser. No. 889,210, Mar. 23, 1978, abandoned.

[51] Int. Cl.$^3$ .................. B65G 25/00; B63G 43/08
[52] U.S. Cl. .......................... 198/751; 198/718; 198/774
[58] Field of Search ............ 198/718, 751, 774, 775, 198/776, 777, 469, 341, 339, 857

[56] References Cited

FOREIGN PATENT DOCUMENTS 1902698 8/1970 Fed. Rep. of Germany ........... 198/774

Primary Examiner—Robert B. Reeves
Assistant Examiner—Douglas D. Watts
Attorney, Agent, or Firm—Burton, Parker & Schramm

[57] ABSTRACT

In a walking beam type accumulating conveyor wherein workpieces upstream of an empty workpiece supporting station are transferred in a step-by-step fashion from station to station to fill the empty station and any empty stations upstream of it, the workpieces are lifted from each station for transfer to the next downstream station by workpiece carriers supported on transfer bars which themselves move vertically as well as longitudinally of the conveyor, and to render the conveyor most efficient the decision whether to pick up a workpiece at a station and transfer it to the next downstream station is made during elevation of the transfer bars and just prior to the carrier's engaging the workpiece. The transfer bars operate through a cycle of movement in which they are first raised to cause carriers on them to engage workpieces should the carriers be signalled to do so, then the bars are shifted longitudinally the distance between adjacent workpiece stations, then are lowered to deposit workpieces in workpiece supporting stations, and are then moved in the reverse longitudinal direction to the starting point of the cycle. The decision whether to lift a workpiece and transfer it is made during the elevation step of this cycle of movement.

7 Claims, 10 Drawing Figures

4,240,542

WALKING BEAM ACCUMULATING CONVEYOR

This is a continuation of application Ser. No. 889,210, filed Mar. 23, 1978, now abandoned.

BACKGROUND OF INVENTION

1. Field of Art

The present invention relates to an automatic conveyor system, particularly of the reciprocating walking beam accumulating type.

2. Description of Prior Art

Representative systems for conveying loads in walking beam type conveyors are illustrated by U.S. Pat. Nos. 3,369,650, 3,500,992 and 3,552,543. In these patents a transfer bar (viz. slide 18 U.S. Pat. No. 3,552,543) performs a separate step or movement to determine whether the carriers should be elevated to their feed positions to lift the workpieces from their respective work stations. For example, both U.S. Pat. Nos. -992 and -543 begin their lifting sequence in an initiating position to the left (or upstream) of the position where the carriers will assume their feed positions. The transfer bar is then shifted to the right (or downstream) to determine which carriers will be elevated to their feed positions until the transfer bar reaches a certain position, whereupon the transfer bar is elevated for lifting the workpieces from their work stations. Accordingly, when the transfer bar is returning to its initiating position, it again passes its feed position and is located initially to the left thereof.

The extra step involved for determining which carriers are to be elevated is extremely inefficient. If the decision which carriers are to be elevated is determined just prior to carrier engagement with the workpiece, i.e., at the last possible moment the decision could be made, a greater amount of conveyor time could be used by the operators for placing or removing workpieces onto or from the conveyor without causing a malfunction. Morever, if a conveyor could make the feed position decision at the last possible moment, conveyor time would be considerably saved, since the extra step for determining feed positions would be eliminated. In addition, using the construction of U.S. Pat. Nos. -992 and -543, if a workpiece was placed on the conveyor after the carriers have assumed their feed positions or during the decision process, the conveyor could malfunction creating increased maintenance cost and lack of reliability, as well as substantial inflexibility.

SUMMARY OF THE INVENTION

The above recited problems, as well as many others, are eliminated by providing an automatic conveyor comprising a plurality or work stations each capable of supporting a workpiece therein and associated with a sensing element which assumes a work station empty or a work station full position. The position of the sensing element is thereafter sensed by a link associated with a segmented control bar and pivoted to a reciprocating transfer bar. When the sensing element is in a work station empty position, as the transfer bar is raised vertically, the link positively engages the sensing element thereby elevating an associated carrier from an idle position to a feed position directly beneath a preceding work station. Elevation of the carrier to a feed position also moves a control bar segment rearward, said segment positively engaging the next adjacent rearward segment and moving it rearward such that all carriers upstream of the elevated carrier are also elevated. When the carrier is in its elevated position, the transfer bar continues to move vertically until all carriers in a feed position lift the workpieces from their respective work stations. The transfer bar is moved laterally positioning the carriers at the next succeeding station, whereupon the carriers deposit the workpieces at the succeeding station when the transfer bar is vertically lowered. The transfer bar is then moved laterally toward its initiating position, said carriers being lowered to their idle positions by a stop positively engaging the end carrier.

BRIEF DESCRIPTION OF THE DRAWINGS

FIG. 10 is a perspective view of the reset mechanism for the accumulating conveyor.

BRIEF DESCRIPTION OF PREFERRED EMBODIMENTS

Figure 1:
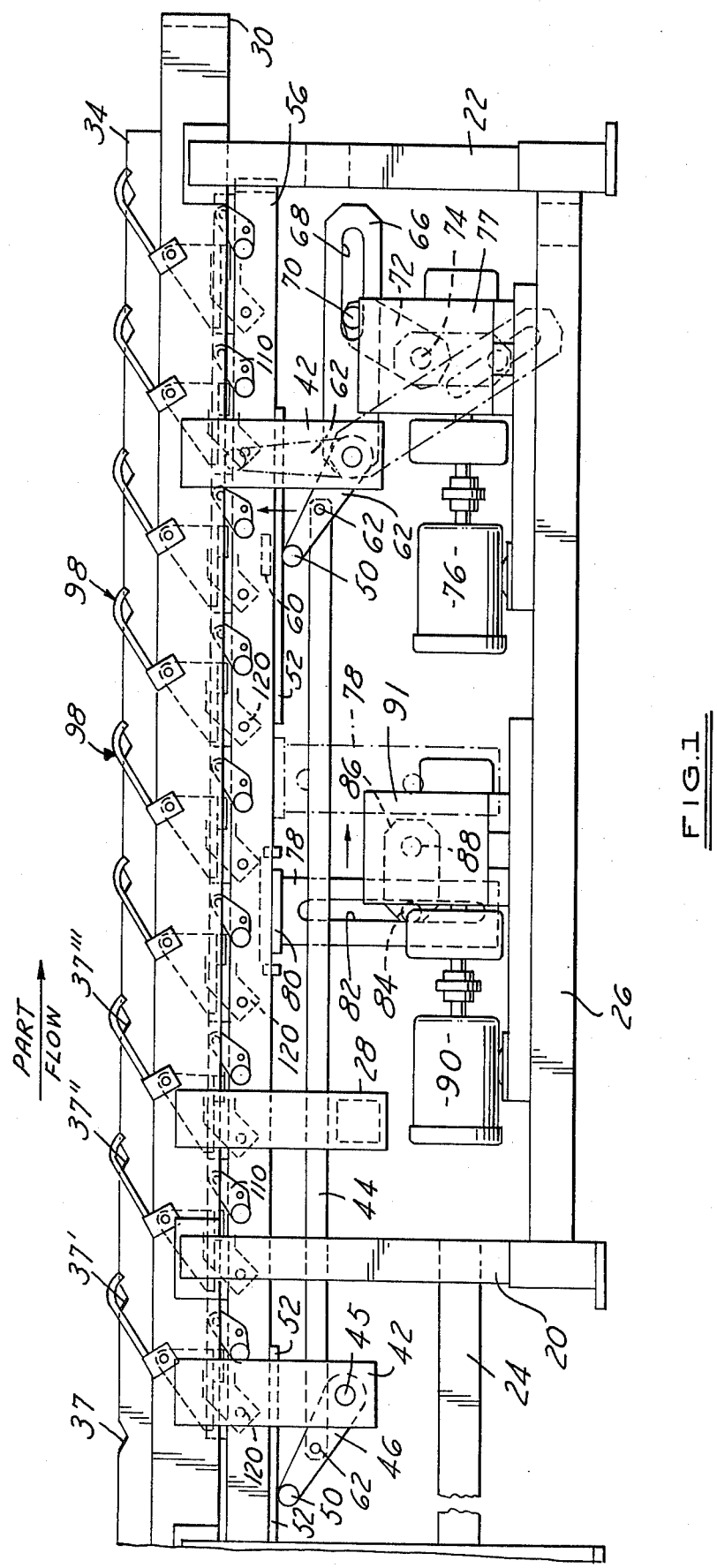
FIG. 1 is a side elevation of a section of an accumulating conveyor.
Figure 3:
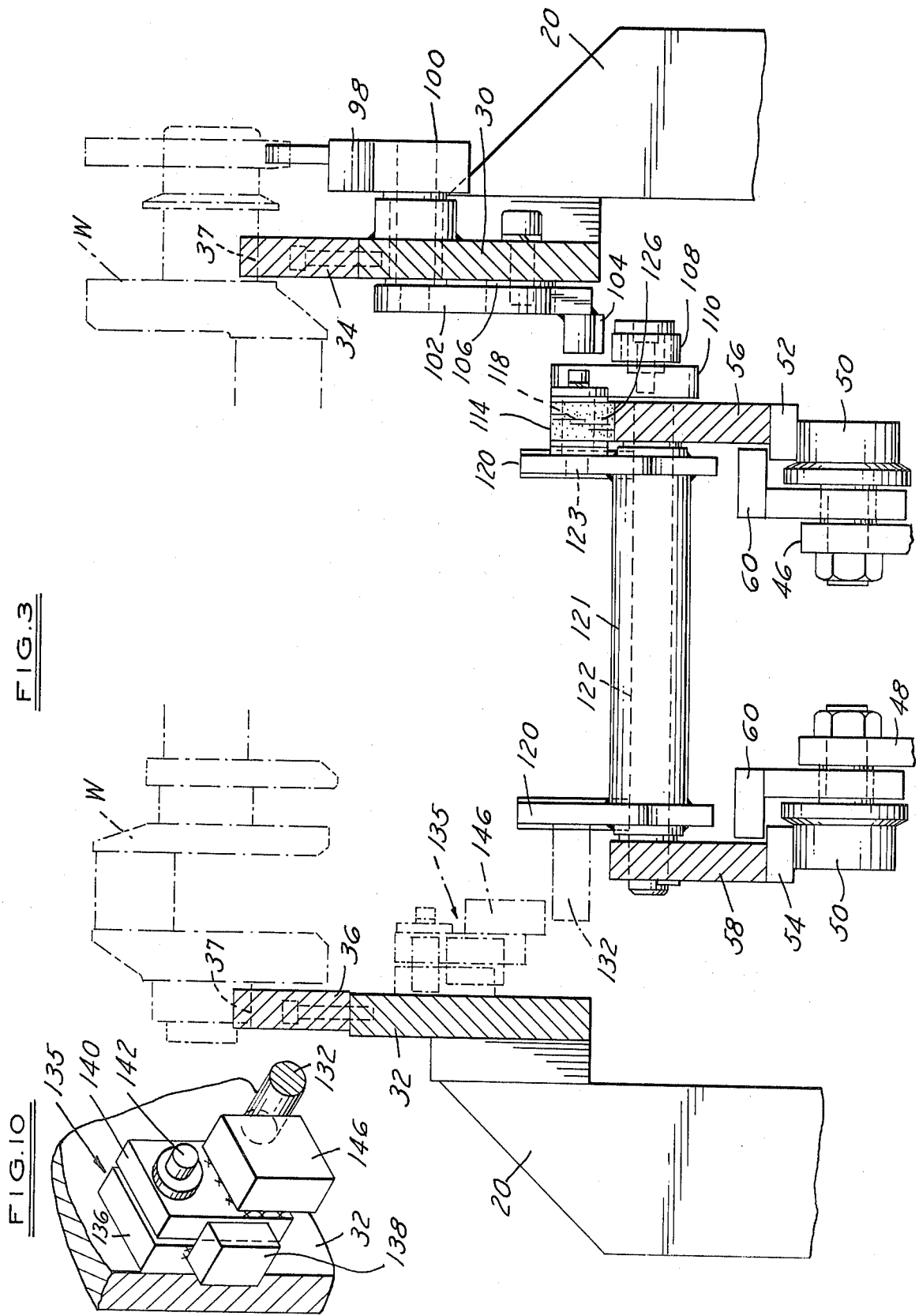
FIG. 3 is a cross-sectional view of the accumulating conveyor taken along line 3—3 of FIG. 2.

Referring now to FIGS. 1 and 3 there is illustrated a portion of an accumulating walking beam conveyor embodying the invention wherein the transfer decision is made on the vertical stroke of a transfer bar. The conveyor comprises a supporting portion comprising posts 20, 22, longitudinal supports 24, 26, and cross member 28, said cross member 28 being fixedly secured to a pair of stationary rails 30, 32 each of which supports a respective work station rail 34, 36 adjacent its upper edge, as best seen in FIG. 3. A series of spaced apart notches 37 in the rails 34 and 36 define work stations for supporting workpieces W.

Spaced apart and depending from stationary rails 30 and 32 are pairs of hangers 42 (only one hanger of each pair being shown in FIG. 1). Each pair of hangers rotatably supports a cross shaft 45 on which is mounted a pair of levers 46 and 48 with the pairs on adjacent cross shafts being tied together for conjoint movement by tie bars, one of which is shown at 44 in FIG. 1. Each lever has a roller 50 at its distal end (see FIGS. 1 and 3) engaging pads 52 and 54 on the undersides of a pair of longitudinally extending transfer bars 56 and 58 for supporting and lifting the bars.

Secured to each lever adjacent each roller is guide 60 for preventing vertical separation of the transfer bars 56 and 58 from their seats on associated roller 50. Fixedly secured to one of the cross shafts 45 is a driving arm 66 having a slot 68 for receiving a roller 70 on oscillating member 72 which is driven about a pivot 74 by reversible motor 76 and transmission 77. Member 72 swings between the positions shown in FIG. 1 to in turn swing arm 66 between the solid and phantom outline positions shown. Conventional limit switches may be utilized to reverse operation of motor 76 to swing the members as aforesaid between such limits. FIG. 1 shows levers 46 in full lines in lowered positions and member 72 extends generally upwardly. Upon operation of motor 76 in a direction to move member 72 clockwise, arm 66 is moved to the phantom outline position and levers 46 and 48 have lifted transfer bars 56 and 58 to their highest vertical travel shown best in FIGS. 5 and 6.

Means are also provided for longitudinally moving the transfer bars 56 and 58 as shown in FIG. 1. Such means comprises a Scotch Yoke mechanism having a slotted cross-head 78 affixed to a bridge 80 extending between and secured to the transfer bars. A roller 84 on a crankpin 86 is received in the slot 82 of the cross-head. Motor 90 drives the crankpin through transmission 91 whereby the transfer bars may be reciprocated longitudinally when either in their lower position or upper position.

In FIG. 1 cross-head 78 is shown in full lines in its leftmost position and in phantom lines is in its rightmost position. The travel of the cross-head 78 from its leftmost position to its rightmost position (which is also the longitudinal travel of the transfer bars 56 and 58) is the equivalent of the distance between adjacent work stations as defined by the notches 37 in the rails 34 and 36.

Figure 2:
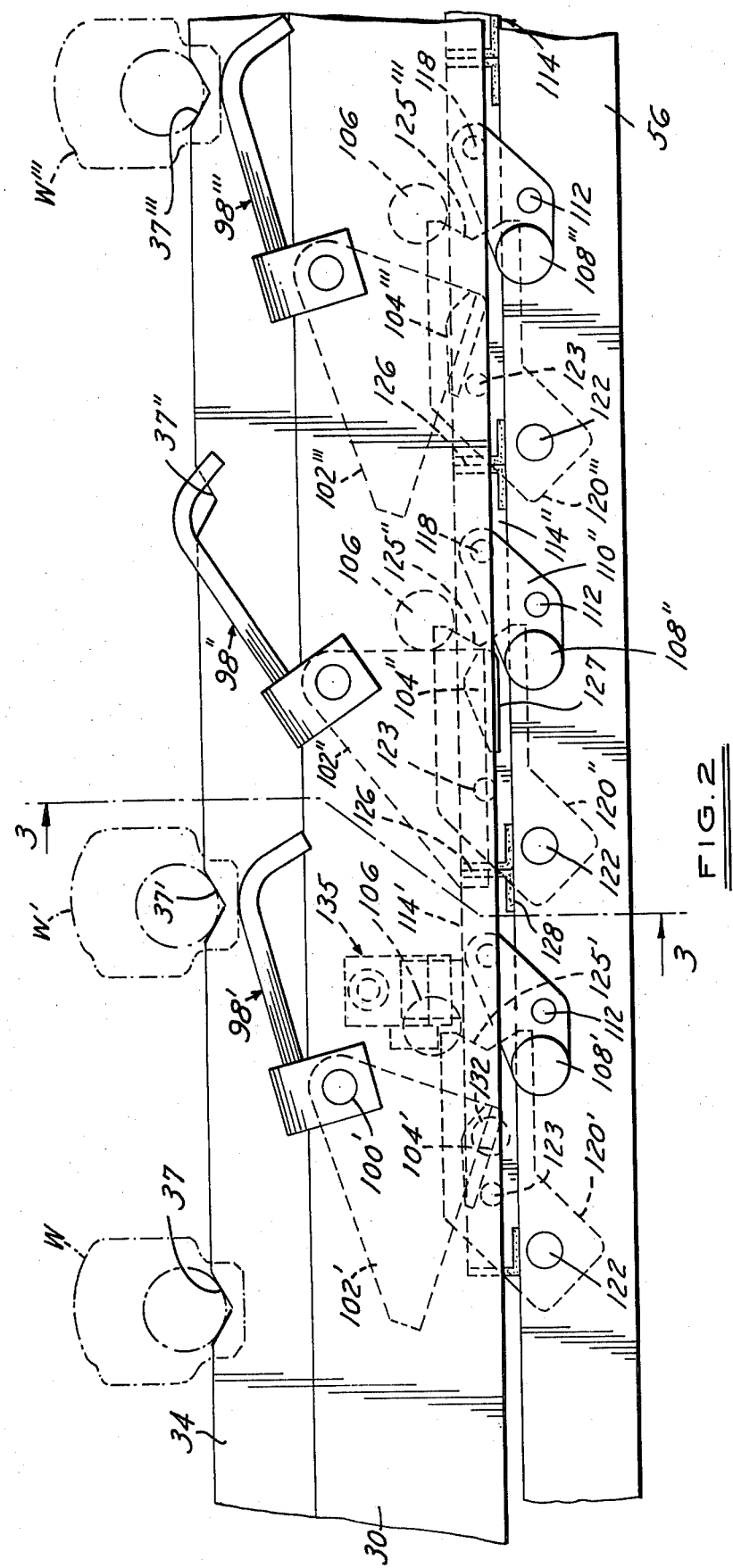
FIG. 2 is a fragmentary side elevational view of the accumulating conveyor in FIG. 1 near the upstream end thereof.

Also carried by stationary rail 30 are sensing means for determining the presence of a workpiece W in a particular work station. As best seen in FIGS. 2 and 3, each work station comprises a pair of the recesses 37 on respective work station rails 34, 36 for receiving a workpiece therein, and the recesses have been primed to distinguish individual stations. A sensing element 98 is provided at each station, the reference numeral for which has been primed to distinguish individual sensing elements. Each element is supported on a shaft 100 extending through rail 30 as shown in FIG. 3. The sensing element includes a triangularly shaped dog 102 of sufficient mass to maintain it against a fixed stop 106 when no part rests in the associated work station. The dog 102 carries a tripping element 104 as shown in FIGS. 2 and 3.

When a workpiece W' is resting on a particular work station, as in work station 37', it engages the sensing element 98' rotating the shaft 100' in a clockwise direction and thus elevating tripping element 104' on dog 102' to the position shown in FIG. 2. However, if no workpiece is present at the station, a condition illustrated by work station 37" of FIG. 2, the sensing element 98" will be in the position shown with dog 102 abutting a stop 106 secured to rail 30. In this position the tripping element 104" is in the path of a roller 108" mounted on a link 110" which is one of a number of such links, one for each work station, which are distinguished by priming reference numerals. The link is pivoted to transfer bar 56 at 112" and to control segment 114" at 118. Control segment 114" is one element of a series of end-abuttable segments of a segmented control bar generally designated as 114. Opposite ends of the control segment as well as the undersides of the segment at their ends are provided with elastomeric pads 126 and 128 respectively to cushion shocks and prevent bouncing.

Pivotally mounted in paired relation on the transfer bars 56, 58, one pair for each workpiece supporting station, are workpiece carriers generally designated 120, but having primed reference numerals to individually distinguish them. Each pair is connected by a sleeve 121 (see FIG. 3) mounted on shaft 122. One carrier of each pair is pivotally connected at 123 to abut the lower surface 127 of tripping element 104". The link 110" is swung in a counterclockwise direction about pivot 112 causing the segment 114" and carrier pair 120" to be swung upwardly through the position shown in FIG. 4 until the carriers reach the feed position shown in FIG. 5. Owing to the offset nature of link 110, the action of roller 108 abutting tripping element 104 rotates link 110 in a counterclockwise direction, swinging the roller 108 out from beneath the tripping element 104 as shown in FIG. 4, and as the transfer bar continues its upward vertical movement the roller 108 clears element 104 as shown in FIG. 5.

Figure 4:
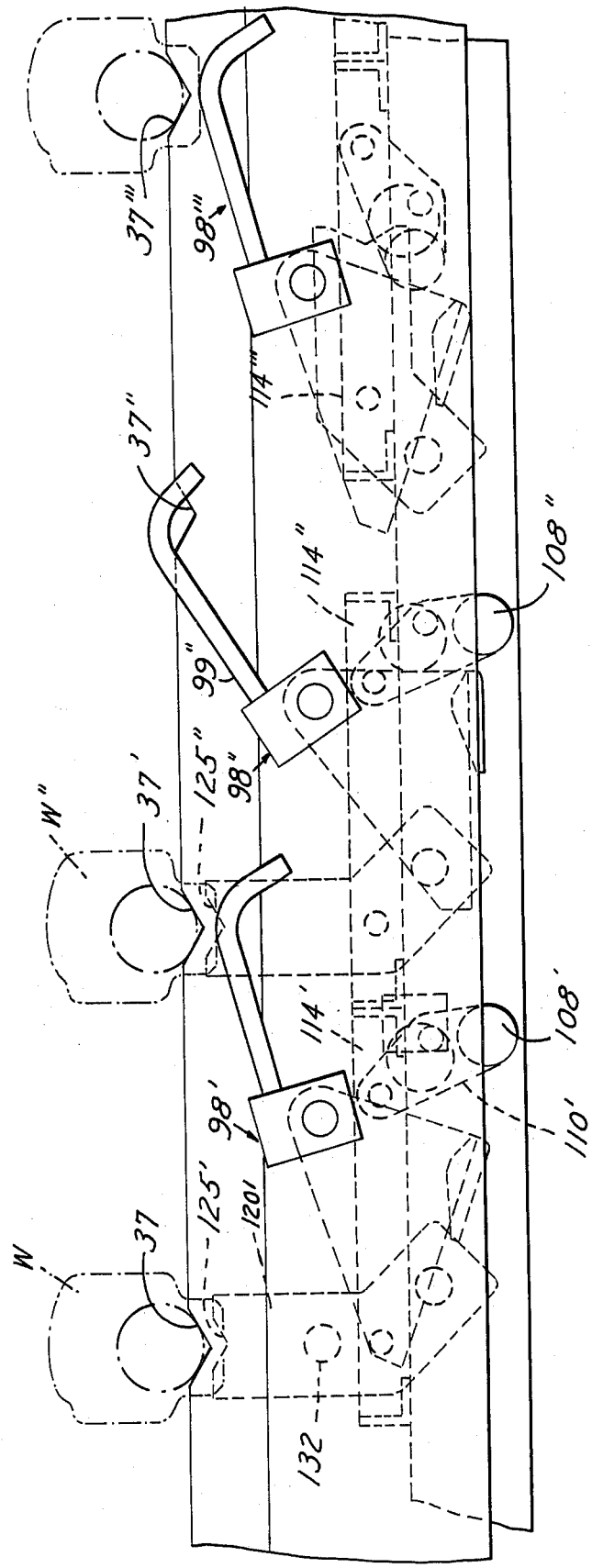
FIGS. 4 and 5 are similar to FIG. 2, showing parts in sequentially different operating positions.

When carriers 120 are rotated to their lifting position of FIG. 4 from idle position of FIG. 2, the carriers are in a position to lift the workpieces from the work stations as the transfer bars continue to rise. In FIG. 5 the carriers 120' and 120" are shown in their feed position after lifting the workpieces and just prior to transfer longitudinally to the next station, while carrier 120''' has not been shifted to the feed position and workpiece W'''' has not been disturbed. Each carrier has a recess 125 in the upper surface thereof for lifting a workpiece from its associated recesses on stationary rails 34, 36.

The only carriers 120 which are shifted from idle to feed positions are those upstream (to the left as viewed in FIGS. 1, 4, 5, 8 and 9) from an empty station. When a sensor, such as 98''', detects an empty station, as in FIG. 2, the control segment 114" associated with that station is swung upwardly as above explained carrying with it all control segments 114 upstream of it by virtue of the end-abutting relation of the segments. The action of adjacent segments is best illustrated in FIG. 4 where segment 114' is shown as swung to the feed position by the action of segment 114", while all transfer segments downstream of the empty work station, shown as work station 37''', remain in their idle position. Thus, all carriers upstream of the empty work station will shift to their feed positions by the action of each transfer segment abutting its next adjacent upstream transfer segment, while all carriers downstream will remain idle (assuming, of course, there are no empty stations downstream).

Figure 5:
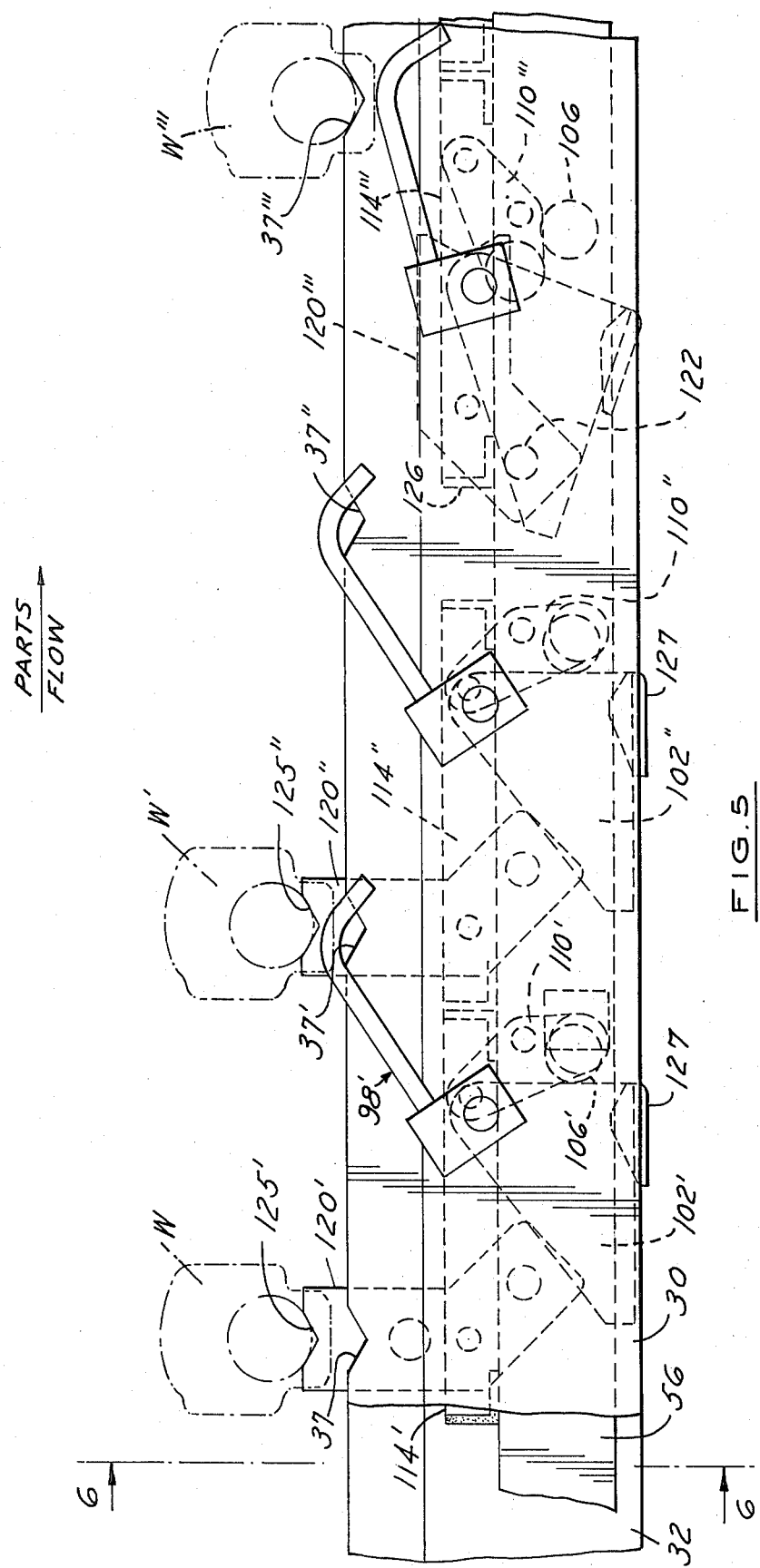
Figure 6:
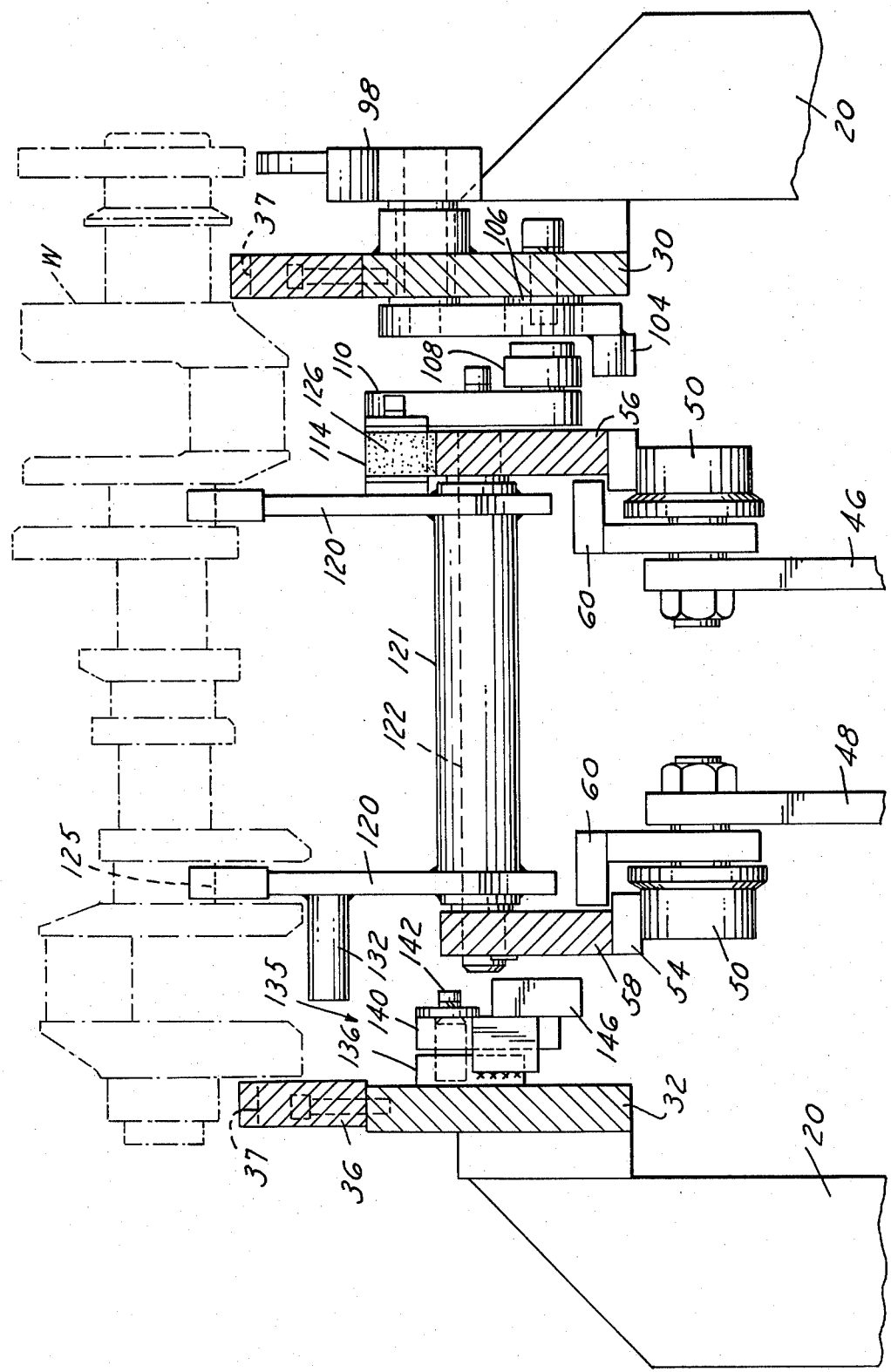
FIG. 6 is a cross-sectional view taken along line 6—6 of FIG. 5 and shows a workpiece after lifting from a work station.
Figure 7:
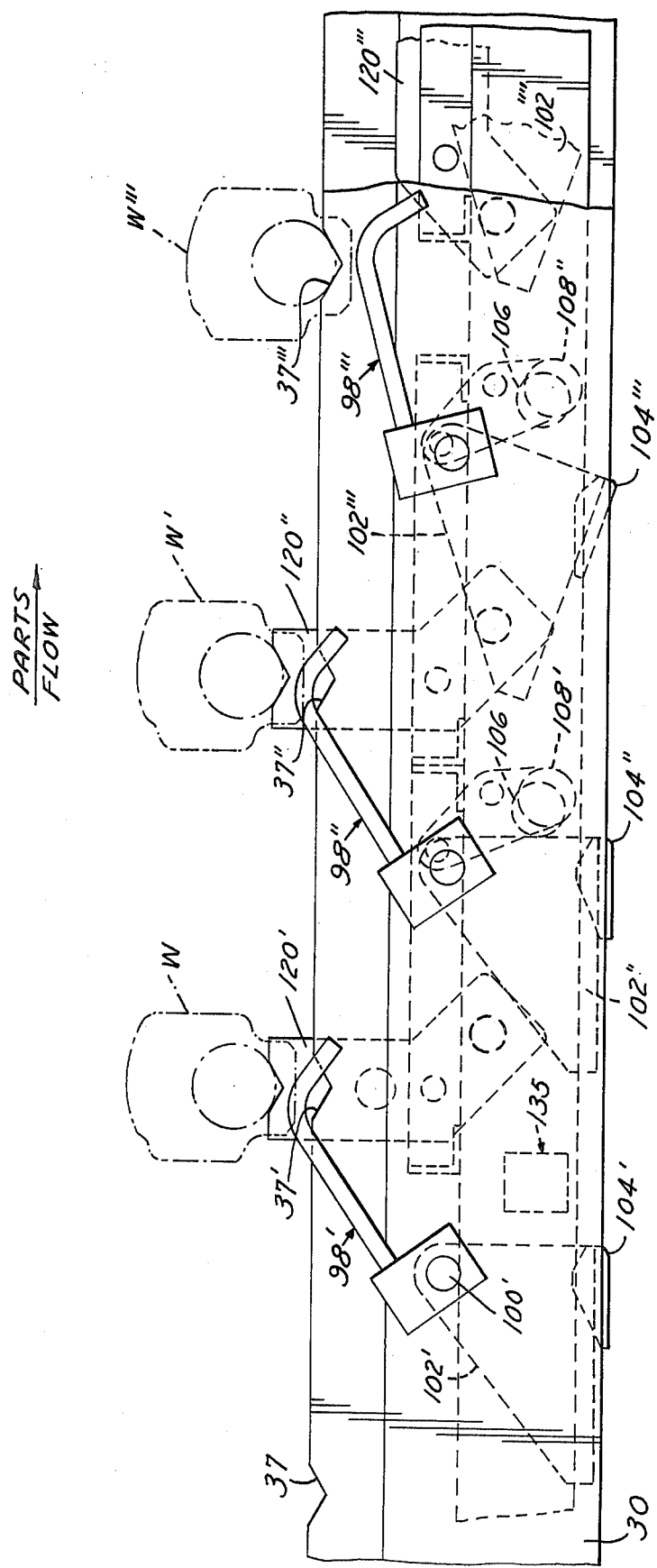
FIGS. 7, 8 and 9 are similar to FIG. 2, showing parts in sequentially different operating positions.
Figure 8:
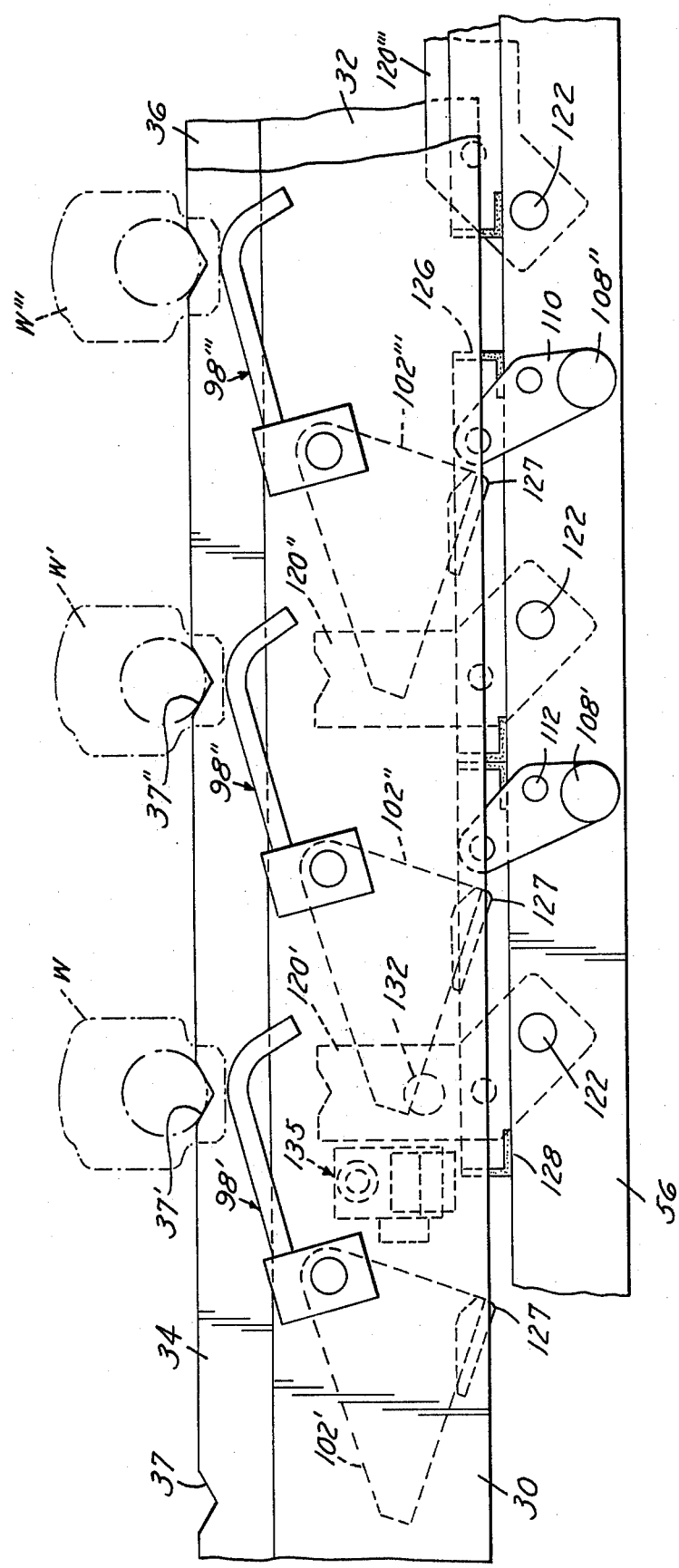
Figure 9:
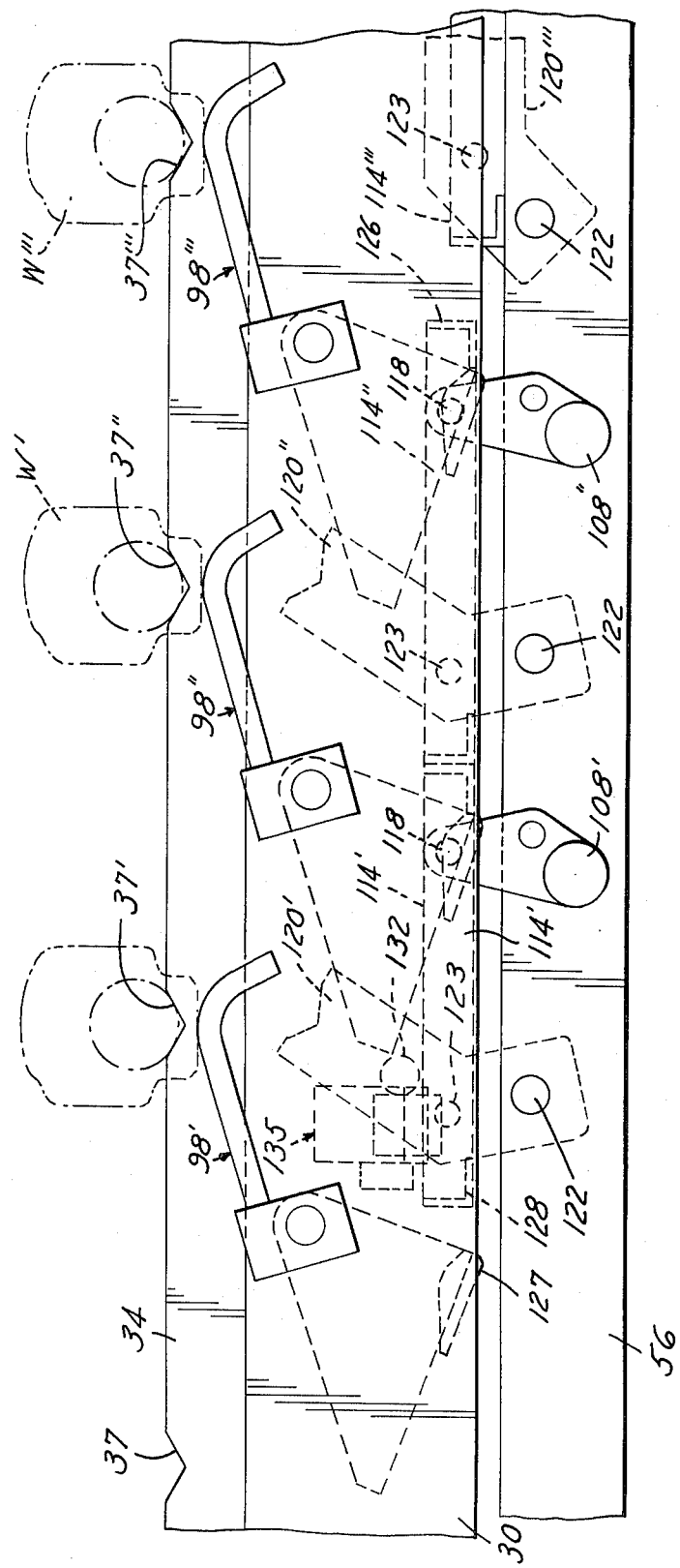

From the FIG. 5 position the workpieces are moved by the carriers longitudinally of the conveyor to the position shown in FIG. 7, which is the next adjacent workpiece supporting station. This is effected by the clockwise 180° rotation of the crank 86 moving the transfer bars to the right a distance euqal to the spacing between adjacent stations. It will be noted in FIG. 7 that the workpieces W and W' are disposed directly above stations 37' and 37" such that upon lowering of the carriers 120' and 120" the workpieces will be disposed in the work stations as shown in FIG. 8.

The transfer bars now shift back to the left as a result of reverse operation of drive motor 90 causing the Scotch Yoke to shift the slotted cross-head 78 to the left from the phantom to the solid outline position shown in FIG. 1. During such movement of the transfer bars, the carriers are swung from the workpiece lifting position to the idle position and in FIG. 9 carriers 120' and 120" are shown in the act of being swung back to their idle positons. Return of the carriers to idle position is effected by a reset mechanism generally indicated 135 in FIGS. 3 and 10. The mechanism is disposed at the upstream end of the conveyor to cooperate with a laterally projecting reset pin 132 disposed on one of the carriers as shown in FIG. 3. The reset mechanism 135 is mounted on the side rail 32 of the conveyor and comprises a mounting block 136 secured to the side rail and carrying a pivot axle 142 on which is swingably mounted a pivot block 140. A stock member 138 is secured to the block 136 to limit swing of the pivot block 140 in an upstream direction. A dog 146 is secured to the pivot block 140 in a position to be engaged by the reset pin 132 upon return of the transfer bars from the FIG. 8 to the FIG. 9 positions. As the reset pin 132 engages the dog 146 it causes the carrier 120' to be swung clockwise as viewed in FIG. 9 thereby shifting the transfer segment 114' to the right and this in turn shifts any abutting downstream segment also to the right thereby swinging the associated carriers to their idle positions shown in FIG. 2. The dog 146 is free to swing as shown in FIG. 10 if for any reason the reset pit 132 should engage the dog from the opposite side during a shifting of the transfer bars.

From the foregoing description it is apparent that the transfer bars 56 and 58 with their associated workpiece carriers 120 are supported for movement through a cycle of operation wherein from an initial position shown in FIG. 2 the transfer bars are first elevated to the FIG. 5, article-feeding position, passing through an article-lifting position for the carriers shown in FIG. 4. Movement of the transfer bars from the FIG. 2 to the FIG. 5 position is carried out in a single elevating stroke by levers 46 upon operation of motor 76. The second step in the cycle of operation is transfer of the workpieces from their FIG. 5 position to that of FIG. 7 where they have been transferred one space to the right. This second step is accomplished by operation of motor 90 shifting the slotted cross-head 78 from the solid to the phantom outline position of FIG. 1. The third step in the cycle of movement is the lowering of the workpieces accomplished by the reverse motion of levers 46 upon swinging of the slotted cross-head 66 from its phantom to solid outline position shown in FIG. 1 whereby the transfer bars are lowered to the position shown in FIG. 8. Finally, in the last step of the cycle of movement the transfer bars are shifted in the reverse direction to their initial starting position shown in FIG. 2 as a result of reverse operation of motor 90 shifting the slotted cross-head 78 from the phantom to the solid outline position of FIG. 1.

During the foregoing cycle of operation in the movement of the transfer bars the carriers 120 are shifted to their article-lifting positions shown in FIG. 4 during the first step in the cycle of operation, namely during elevation of the transfer bars. This is the last possible moment during operation of the conveyor that the decision can be made as to which carriers will be shifted to the workpiece-lifting position. In other words, a workpiece may be placed in a station at any moment up to the instant the transfer bars begin to be elevated. In an operative embodiment of the invention there is one-quarter inch space between the roller 108 and the underside of the trip 104. As the transfer bars are elevated moving the roller 108 through such quarter-inch distance the decision whether a given carrier will be shifted to the workpiece-lifting position must at that instant have been made. The decision is, of course, made by the condition of the workpiece sensors 98. Accordingly, a workpiece may be placed in a station at any moment up to the point at which the transfer bars begin to be elevated, and, if placed in a station prior to commencement of transfer bar elevation, the workpiece will be transferred to the next downstream station should transfer be called for.

It will also be apparent from the foregoing description that the sensing means 98 is responsive to the absence of a workpiece at a work support station during the elevation of the transfer bars to cause shifting of the carriers at the station upstream of the empty station from idle to feed position during elevation of the bars.

What is claimed is:

1. In a walking beam type accumulating conveyor having a plurality of longitudinally spaced apart work stations:
    transfer bars supported for movement beneath the stations through a cylce of operations wherein from a starting position the bars are first elevated, then moved longitudinally of the stations a distance corresponding to the space between the stations, then lowered and finally returning longitudinally in the opposite direction to the starting position;
    carriers pivotally mounted on the transfer bars and swingable between idle and feed positions and operable in feed positions to transfer workpieces from station to station;
    carrier shifting means joined to the carriers and supported on the transfer bars;
    sensing means at each station in the path of the carrier shifting means during elevation of transfer bar when there is no workpiece at the station but out of the path of the carrier shifting means when there is a workpiece at the station, and
    said carrier shifting means co-responsive to the elevation of the transfer bars and abutment with the sensing means to shift all carriers upstream from any empty station from idle to feed position during such elevation of the bars.

2. The conveyor of claim 1 wherein said carrier shifting means includes a carrier shifting link joined to each carrier and pivoted to the transfer bar such that raising the transfer bars enable the link to abut sensing means at vacant stations.

3. The conveyor of claim 1 wherein said carrier shifting means also includes end abutting segments each joined to one of said links and one of said carriers so to require pivoting of said carrier and link in the same sense during abutment of said link with the sensing means during elevation of the transfer bars and to convey like pivotal movement to all carriers rearward of said carrier through abutment of said segment with the said link located therebehind.

4. The conveyor of claim 1 wherein said carrier shifting means includes a roller at each station co-responsive to the elevation of the transfer bars and abutment with the sensing means at an empty station to roll along a surface of the sensing means to cause said shifting of the carriers upstream of said empty station from its idle to feed position.

5. In a walking beam type accumulating conveyor having a plurality of longitudinally spaced apart work stations:
    transfer bars supported for movement beneath the stations through a cycle of operations wherein from a starting position the bars are first elevated, then moved longitudinally of the stations a distance corresponding to the space between the stations, then lowered and finally returning longitudinally in the opposite direction to the starting position;
    a sensor at each station having a first position corresponding to the presence of a workpiece at that station and a second position corresponding to the absence of a workpiece at that station;
    a cam surface on said sensor;
    a linkage at each station comprising a carrier having idle and feed positions pivoted to the transfer bars and operable in feed position to transfer workpieces from station to station; a control segment supported on one of the transfer bars and joined to the carrier; and a roller joined to the carrier;

the linkage coresponsive to the elevation of the transfer bars and abutment of the roller with the cam surface when the sensor is in its first position to move the linkage relative the transfer bars so to pivot the carrier to its transfer position and to cause by means of said link like movement of all linkages upstream.

6. The carrier of claim 5 wherein the linkage comprises a three bar linkage wherein one bar comprises the carrier, the second bar comprises the control segment, and the third bar is parallel to the carrier and has the roller mounted thereon, and the like movement of all linkages upstream is caused by abutment between said segment and corresponding segments on the linkages upstream.

7. The invention defined by claim 2 wherein said sensing means includes a tripper element shiftable into the path of elevation of said link when the associated station is empty and cooperable with the link to shift the carrier to feed position during elevation of the transfer bars.

* * * * *

UNITED STATES PATENT AND TRADEMARK OFFICE
CERTIFICATE OF CORRECTION

PATENT NO. : 4,240,542
DATED : December 23, 1980
INVENTOR(S) : Douglas D. Wiknich It is certified that error appears in the above—identified patent and that said Letters Patent is hereby corrected as shown below:

Column 6, line 35, "claim 1" should read -- claim 2 --.

Signed and Sealed this

Thirty-first Day of March 1981

[SEAL]

Attest:

RENE D. TEGTMEYER

Attesting Officer

Acting Commissioner of Patents and Trademarks